US011268930B2

(12) United States Patent
Rodier et al.

(10) Patent No.: US 11,268,930 B2
(45) Date of Patent: Mar. 8, 2022

(54) TRIGGERED SAMPLING SYSTEMS AND METHODS

(71) Applicant: Particle Measuring Systems, Inc., Boulder, CO (US)

(72) Inventors: Daniel Rodier, Boulder, CO (US); Brian Knollenberg, Boulder, CO (US); Isidro Sanchez, Boulder, CO (US)

(73) Assignee: PARTICLE MEASURING SYSTEMS, INC., Boulder, CO (US)

( * ) Notice: Subject to any disclaimer, the term of this patent is extended or adjusted under 35 U.S.C. 154(b) by 0 days.

(21) Appl. No.: 17/002,441

(22) Filed: Aug. 25, 2020

(65) Prior Publication Data
US 2021/0063349 A1 Mar. 4, 2021

Related U.S. Application Data

(60) Provisional application No. 62/891,819, filed on Aug. 26, 2019.

(51) Int. Cl.
*G01N 27/622* (2021.01)
*H01J 49/14* (2006.01)
*H01J 49/16* (2006.01)

(52) U.S. Cl.
CPC .......... *G01N 27/622* (2013.01); *H01J 49/145* (2013.01); *H01J 49/168* (2013.01)

(58) Field of Classification Search
CPC .......... H01J 49/00; H01J 49/02; H01J 49/145; H01J 49/168; H01J 49/0431; H01J 49/0404; H01J 49/0422; H01J 49/26; G01N 27/622
(Continued)

(56) References Cited

U.S. PATENT DOCUMENTS

| 4,798,465 A | 1/1989 | Knollenberg |
| 4,893,928 A | 1/1990 | Knollenberg |

(Continued)

FOREIGN PATENT DOCUMENTS

| CN | 109307724 A1 | 2/2019 |
| TW | 201124710 A1 | 7/2011 |

(Continued)

OTHER PUBLICATIONS

International Search Report and Written Opinion dated Nov. 23, 2020 in International Application No. PCT/US2020/047813, 13 pp.
(Continued)

*Primary Examiner* — Jason L Mccormack
(74) *Attorney, Agent, or Firm* — Leydig, Voit & Mayer, Ltd.

(57) ABSTRACT

Described herein are monitoring systems and methods, including for airborne molecular contamination (AMC), that combine a sampler, such as an impinger or sorbent tube with a real time analyzer, such as an ion mobility spectrometer (IMS) or optical particle counter. The system may allow for selective sampling in which the sampler is only exposed to the target fluid during periods in which the real time analyzer detects analytes, such as molecular contamination or particles, meeting particular criteria such the composition and/or concentration of analytes. The invention also includes impinger systems having a sampler reservoir comprising an anion leaching resistant material characterized by low anion leach rates in the presence of deionized water.

25 Claims, 8 Drawing Sheets

Figure 1:
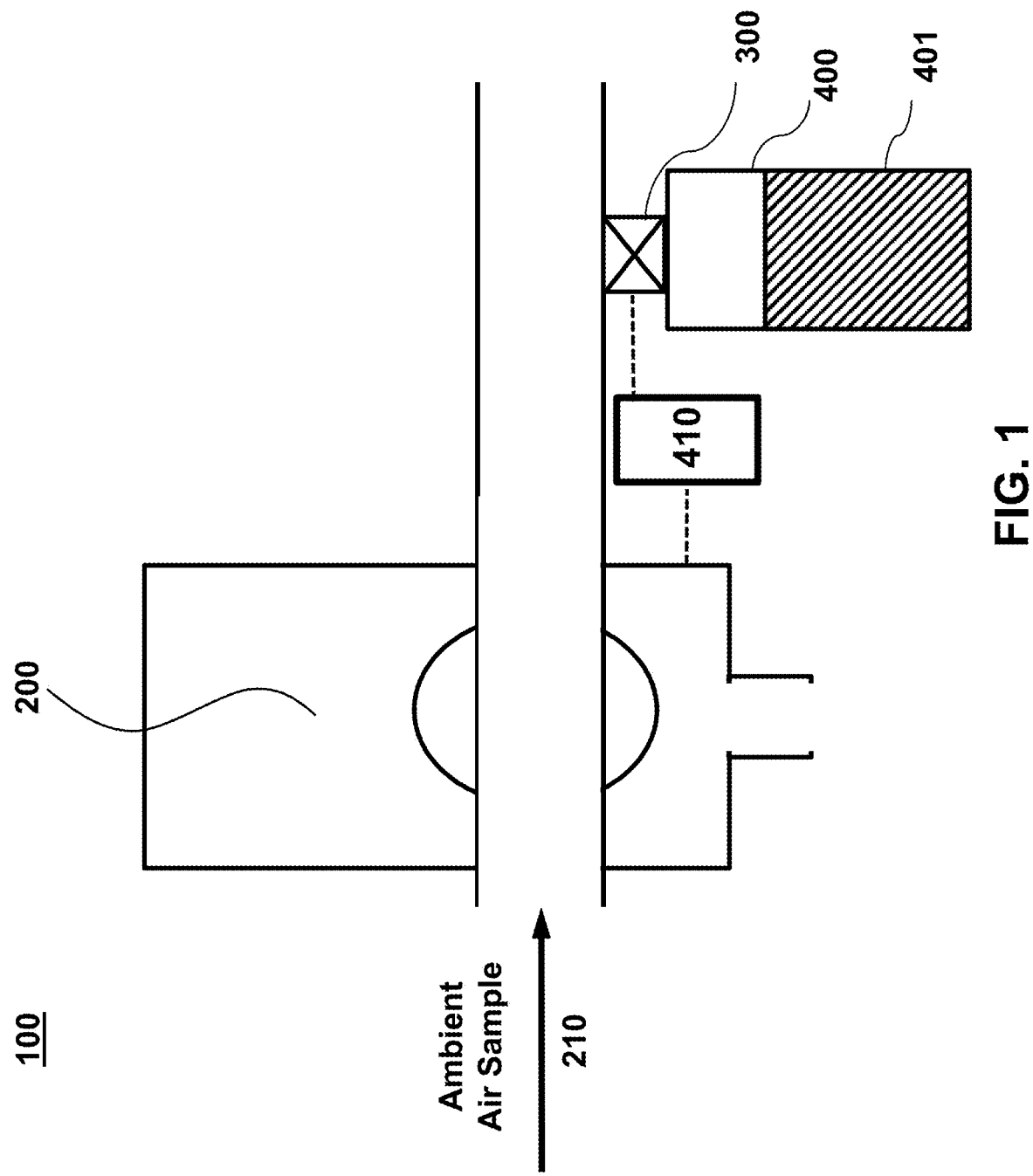

(58) Field of Classification Search
USPC .............................. 250/281, 282, 286, 288
See application file for complete search history.

(56) References Cited

U.S. PATENT DOCUMENTS

| | | | |
|---|---|---|---|
| 5,095,206 | A | 3/1992 | Bacon, Jr. et al. |
| 5,200,614 | A | 4/1993 | Jenkins |
| 5,282,151 | A | 1/1994 | Knollenberg |
| 5,283,199 | A | 2/1994 | Bacon, Jr. et al. |
| 5,491,337 | A | 2/1996 | Jenkins et al. |
| 5,671,046 | A | 9/1997 | Knowlton |
| 5,725,634 | A | 3/1998 | Takasuga et al. |
| 5,726,753 | A | 3/1998 | Sandberg |
| 5,751,422 | A | 5/1998 | Mitchell |
| 5,805,281 | A | 9/1998 | Knowlton et al. |
| 5,861,950 | A | 1/1999 | Knowlton |
| 5,889,589 | A | 3/1999 | Sandberg |
| 5,903,338 | A | 5/1999 | Mavliev et al. |
| 6,167,107 | A | 12/2000 | Bates |
| 6,225,623 | B1 | 5/2001 | Turner et al. |
| 6,246,474 | B1 | 6/2001 | Cerni et al. |
| 6,275,290 | B1 | 8/2001 | Cerni et al. |
| 6,615,679 | B1 | 9/2003 | Knollenberg et al. |
| 6,709,311 | B2 | 3/2004 | Cerni |
| 6,859,277 | B2 | 2/2005 | Wagner et al. |
| 6,903,818 | B2 | 6/2005 | Cerni et al. |
| 6,945,090 | B2 | 9/2005 | Rodier |
| 7,030,980 | B1 | 4/2006 | Sehler et al. |
| 7,088,446 | B2 | 8/2006 | Cerni |
| 7,088,447 | B1 | 8/2006 | Bates et al. |
| 7,208,123 | B2 | 4/2007 | Knollenberg et al. |
| 7,235,214 | B2 | 6/2007 | Rodier et al. |
| RE39,783 | E | 8/2007 | Cerni et al. |
| 7,456,960 | B2 | 11/2008 | Cerni et al. |
| 7,576,857 | B2 | 8/2009 | Wagner |
| 7,667,839 | B2 | 2/2010 | Bates |
| 7,746,469 | B2 | 6/2010 | Shamir et al. |
| 7,796,255 | B2 | 9/2010 | Miller |
| 7,916,293 | B2 | 3/2011 | Mitchell et al. |
| 7,973,929 | B2 | 7/2011 | Bates |
| 7,985,949 | B2 | 7/2011 | Rodier |
| 8,027,035 | B2 | 9/2011 | Mitchell et al. |
| 8,109,129 | B2 | 2/2012 | Gorbunov |
| 8,154,724 | B2 | 4/2012 | Mitchell et al. |
| 8,174,697 | B2 | 5/2012 | Mitchell et al. |
| 8,427,642 | B2 | 4/2013 | Mitchell et al. |
| 8,800,383 | B2 | 8/2014 | Bates |
| 8,869,593 | B2 | 10/2014 | Gorbunov et al. |
| 9,631,222 | B2 | 4/2017 | Ketcham et al. |
| 9,638,665 | B2 | 5/2017 | Gorbunov |
| 9,682,345 | B2 | 6/2017 | Gromala et al. |
| 9,808,760 | B2 | 11/2017 | Gromala et al. |
| 9,810,558 | B2 | 11/2017 | Bates et al. |
| 9,885,640 | B2 | 2/2018 | Ketcham et al. |
| 9,989,462 | B2 | 6/2018 | Lumpkin et al. |
| 10,175,196 | B2 | 1/2019 | Guharay et al. |
| 10,197,487 | B2 | 2/2019 | Knollenberg et al. |
| 10,345,200 | B2 | 7/2019 | Scialo et al. |
| 10,371,620 | B2 | 8/2019 | Knollenberg et al. |
| 10,792,694 | B2 | 10/2020 | Gorbunov et al. |
| 10,859,487 | B2 | 12/2020 | Knollenberg et al. |
| 10,908,059 | B2 | 2/2021 | Knollenberg et al. |
| 10,921,229 | B2 | 2/2021 | Shamir |
| 10,928,293 | B2 | 2/2021 | Knollenberg et al. |
| 2002/0134933 | A1 | 9/2002 | Jenkins et al. |
| 2003/0008341 | A1* | 1/2003 | Spurrell ............... G01N 1/2205 435/34 |
| 2003/0235926 | A1* | 12/2003 | Knollenberg ........ G01N 29/222 436/181 |
| 2005/0028593 | A1 | 2/2005 | Rodier |
| 2005/0183490 | A1 | 8/2005 | Grayfer et al. |
| 2009/0078862 | A1 | 3/2009 | Rodier et al. |
| 2009/0190128 | A1 | 7/2009 | Cerni et al. |
| 2009/0268202 | A1 | 10/2009 | Wagner |
| 2010/0123074 | A1* | 5/2010 | Suh ....................... H01J 49/105 250/282 |
| 2014/0284472 | A1* | 9/2014 | Verenchikov ......... H01J 49/406 250/282 |
| 2015/0000595 | A1 | 1/2015 | Gorbunov et al. |
| 2015/0082864 | A1 | 3/2015 | Chen et al. |
| 2015/0259723 | A1 | 9/2015 | Hartigan et al. |
| 2016/0002700 | A1 | 1/2016 | Ketcham et al. |
| 2016/0126081 | A1 | 5/2016 | Gorbunov |
| 2016/0139013 | A1 | 5/2016 | Gorbunov |
| 2016/0320359 | A1 | 11/2016 | Chuang et al. |
| 2018/0233342 | A1 | 8/2018 | Boock et al. |
| 2019/0250785 | A1* | 8/2019 | Pandolfi ............... G01C 21/206 |
| 2019/0346345 | A1 | 11/2019 | Scialo et al. |
| 2020/0072729 | A1 | 3/2020 | Lumpkin et al. |
| 2020/0150017 | A1 | 5/2020 | Bates et al. |
| 2020/0150018 | A1 | 5/2020 | Shamir |
| 2020/0158603 | A1 | 5/2020 | Scialo et al. |
| 2020/0240896 | A1 | 7/2020 | Karasikov et al. |
| 2020/0355599 | A1 | 11/2020 | Rodier et al. |
| 2021/0044978 | A1 | 2/2021 | Michaelis et al. |
| 2021/0063349 | A1 | 3/2021 | Rodier et al. |
| 2021/0102884 | A1 | 4/2021 | MacLaughlin et al. |
| 2021/0104146 | A1 | 4/2021 | MacLaughlin et al. |
| 2021/0136722 | A1 | 5/2021 | Scialo et al. |
| 2021/0140867 | A1 | 5/2021 | Knollenberg et al. |
| 2021/0190659 | A1 | 6/2021 | Knollenberg et al. |
| 2021/0208054 | A1 | 7/2021 | Ellis et al. |

FOREIGN PATENT DOCUMENTS

| | | |
|---|---|---|
| WO | WO 2000/042427 | 7/2000 |
| WO | WO 2021/091592 | 5/2021 |

OTHER PUBLICATIONS

Office Action dated Jun. 10, 2021 in Taiwan Application No. 109128897, 27 pp.

* cited by examiner

Impinger Bottle Material Testing

| | Mat'l A | Mat'l B | Mat'l C | Mat'l A | Mat'l B | Mat'l C |
|---|---|---|---|---|---|---|
| stagnation time (weeks): | 4 | 4 | 4.7 | 4 | 4 | 4.7 |
| Species | µg/L of DI | | | PPBv (If impinger collection ran for 1 Hr in DI sample) | | |
| Fluoride (F-) | 4.5 | 47 | 0.2 | 1.3 | 12.6 | 0.1 |
| Chloride (Cl-) | 0.9 | 1 | 0.5 | 0.1 | 0.1 | 0.1 |
| Nitrite (NO2-) | 0.3 | * | * | 0.0 | | |
| Bromide (Br-) | * | * | * | | | |
| Nitrate (NO3-) | * | * | * | | | |
| Phosphate (HPO4=) | * | * | * | | | |
| Sulfate (SO4=) | 0.6 | * | 1.4 | 0.0 | | 0.1 |

TRIGGERED SAMPLING SYSTEMS AND METHODS

CROSS-REFERENCE TO RELATED APPLICATIONS

This application claims the benefit of and priority to U.S. Provisional Patent Application No. 62/891,819 filed Aug. 26, 2019, which is hereby incorporated by reference in its entirety.

BACKGROUND OF THE INVENTION

Impingers including bubblers, and sorbent tubes are widely used throughout various industries, including semiconductor manufacturing, for monitoring of airborne molecular contamination. These devices work by flowing a fluid (e.g. air, process gas or mixture of gases) through an absorbent material, a liquid in the case of impingers or bubblers or a granular solid in the case of sorbent tubes. The absorbent material is exposed to the fluid for a set time period, then removed for external testing such as mass spectroscopy or gas chromatography to identify and/or quantify contaminants that were present in the fluid and transferred into the absorbent material.

While the use of impingers and sorbent tubes is both cost effective and accurate, they lack the ability to provide any real time feedback to the manufacturing process. Depending on the time between replacement and analysis of the impinger, contamination may not be detected until days later. Once analyzed, impingers also cannot provide an exact time component as there is no method to determine when the contamination is captured by the impinger, so they provide only that contamination has occurred at some point over a relatively long time period. This means that a large number of manufactured products may have been exposed and must be tested or removed from production.

It can be seen from the foregoing that there remains a need in the art for airborne molecular contamination sampling systems and methods that provide more granularity with regard to the time in which the contamination is captured. These methods would benefit manufacturing in that they more efficiently identify products or articles that could have been exposed to the contamination while allowing for the precision testing afforded by the use of impingers, bubblers and sorbent tubes.

SUMMARY OF THE INVENTION

Described herein are monitoring systems and methods, including for example for airborne molecular contamination (AMC) and/or detection and characterization of biological particles, that combine a sampler, such as an impinger, impactor, filter or sorbent tube with a real time analyzer, for example, for triggering and/or control such that the sampler samples the fluid during periods wherein analytes such as contaminants are more likely to be present and/or are present at certain threshold levels and/or meeting certain detection criteria. The system may allow for selective and/or targeted sampling in which the sampler is exposed to the target fluid during periods in which the real time analyzer detects analytes, such as molecular contamination, meeting particular criteria such the composition, counts per unit time and/or concentration of analytes. The invention also includes impinger systems having a sampler reservoir comprising an anion leaching resistant material characterized by low anion leach rates in the presence of deionized water.

In an aspect, provided are monitoring systems comprising: (i) a real time analyzer for monitoring one or more analytes in a fluid, such as a gas or liquid from a sample, process or environment undergoing monitoring; (ii) a sampler comprising an impinger, impactor, filter or sorbent tube; (iii) a flow system operably connected to the real time analyzer and the sampler; wherein the flow system is configured such that upon detection of the one or more analytes in the fluid by the real time analyzer, for example detection meeting one or more real time analyzer analyte detection criteria, the flow system directs fluid from the sample, process or environment undergoing monitoring to the sampler for sampling, for example, wherein the real time analyzer analyte detection criteria may optionally include one or more of: a threshold concentration of analyte, a threshold amount of analyte, a threshold frequency of detection of analyte, a threshold number of counts of analyte per unit time and a composition of analyte, and wherein optionally fluid is directed to the sampler for a selected duration and/or at a selected rate so as to allow subsequent analysis of analytes sampled by the sampler.

In an embodiment, the flow system is in fluid communication with the fluid undergoing monitoring, for example via a value, actuator, conduit, pump, blower, fan and any combination of these, such the flow system is capable of isolating fluid from the sampler and is capable of directing fluid to a sampler, for example, upon detection of said one or more analytes in said fluid by said real time analyzer meeting one or more real time analyzer analyte detection criteria such as such as one or more of a threshold concentration of analyte, a threshold amount of analyte, a threshold frequency of detection of analyte, a threshold number of counts of analyte per unit time and an analyte composition.

In an embodiment, the flow system is configured such that the sampler samples the fluid upon, and/or after, detection of the one or more analytes meeting one or more real time analyzer analyte detection criteria selected from the group consisting of: a threshold concentration of analyte; a threshold amount of analyte; a threshold frequency of detection of analyte; a threshold number of counts of analyte per unit time; and an analyte composition.

In some embodiments, the real time analyzer analyte detection criteria is a concentration of analyte, such as a threshold concentration of gas phase analyte detected by the real time analyzer greater than or equal to 1 ppb, optionally greater than or equal to 0.5 ppb and optionally greater than or equal to 0.1 ppb, optionally greater than or equal to 0.05 ppb, for example for gas phase analytes comprising one or more acids, bases and/or volatile organic species. In some embodiments, the real time analyzer analyte detection criteria is a threshold count rate, such as a number of particles counted per unit time detected by the real time analyzer, for example, the number of particles counted per unit time by the real time analyzer.

In an embodiment, upon detection of the one or more analytes meeting the one or more real time analyzer analyte detection criteria, a trigger signal is provided to the flow system, which triggers the flow system to direct the fluid to the sampler for sampling, for example, wherein the trigger signal is generated by, or derived from, output from the real time analyzer.

In some embodiments, upon detection of the one or more analytes, optionally meeting the one or more real time analyzer analyte detection criteria such as one or more of a threshold concentration of analyte, a threshold amount of analyte, a threshold frequency of detection of analyte, a threshold number of counts of analyte per unit time and an analyte composition, a trigger signal or other actuation mechanism for initiating the flow system, results in the fluid being directed to the sampler, for example, wherein the flow system is actuated so as to direct fluid from the sample, process or environment undergoing monitoring to the sampler for sampling, wherein in this manner the sampling by sampler is timed coincident with, proximate to (e.g., within 60 sec, optionally 20 sec and optional 1 sec) or a preselected time from the detection event by the real time analyzers optional meeting the one or more real time analyzer analyte detection criteria.

In an embodiment, upon detection of the one or more analytes, for example meeting one or more real time monitoring analyte detection criteria such as one or more of a threshold concentration of analyte, a threshold amount of analyte, a threshold frequency of detection of analyte, a threshold number of counts of analyte per unit time and an analyte composition, fluid from a sample or environment undergoing monitored is directed to the sampler, for example, at a preselected rate, optionally wherein the preselected rate depends on one or more of the concentration of analyte, amount of analyte, frequency of detection of analyte, number of counts of analyte per unit time and/or composition of analyte as determined by the real time analyzer.

In some embodiments, upon triggering or actuation by the flow system the rate that the fluid from the sample, process or environment undergoing monitoring is directed to the sampler is sufficiently large such analyte can be collected, captured or transformed by the sampler to allow for subsequent analysis, and in some embodiment is equal to or greater than 1 ml min$^{-1}$, optionally 10 ml min$^{-1}$, and optionally 100 ml min$^{-1}$. In some embodiments, the rate that the fluid from the sample, process or environment undergoing monitoring is directed to the sampler is greater than or equal to the rate fluid is provided to the real time analyzer, optionally greater than or equal to 10 times the rate fluid is provided to the real time analyzer, optionally greater than or equal to 100 times the rate fluid is provided to the real time analyzer, optionally greater than or equal to 1000 times the rate fluid is provided to the real time analyzer. In some embodiments, the rate and/or duration of sampling (e.g., sampling time) that the fluid from the sample, process or environment undergoing monitoring is directed to the sampler is dependent on the concentration or count rate of analytes detected by the real time analyzer, wherein higher concentration or count rate of analyte results in lower the rates and/or durations of sampling and lower concentration or count rate of analyte results in higher the rates and/or durations of sampling.

In some embodiments, for example, the sampler samples the fluid from the sample, process or environment undergoing monitoring upon or after detection of the one or more analytes characterized by a concentration greater than or equal to a threshold concentration. In some embodiments, for example, the sampler samples the fluid from the sample, process or environment undergoing monitoring upon or after detection of the one or more analytes characterized by an amount per unit time greater than or equal to a threshold amount per unit time, for example, upon detection of analyte counts per unit time greater than or equal to a threshold analyte counts per unit time. In some embodiments, for example, the sampler samples the fluid for at least as long as the real time analyzer detects the one or more analytes. In some embodiments, for example, the sampler samples the fluid for a predetermined time upon detection of the one or more analytes. In some embodiments, for example, the sampler is isolated from the fluid except during a detection event, wherein the onset set of the detection event is triggered by the detection of the one or more analytes in the fluid by the real time analyzer.

The present methods and systems are compatible with a variety of real time analyzers. In some embodiments, for example, the real time analyzer comprises one or more of: an ion mobility analyzer; a mass spectrometry analyzer; a Fourier-transform infrared spectrometer analyzer; a photoacoustic analyzer; a flame ionization analyzer; photoionization analyzer; an electrochemical analyzer; and a cavity ring-down analyzer. In some embodiments, for example, the real time analyzer comprises a separation component. In some embodiments, for example, the separation component comprises a gas chromatography separation component and/or liquid chromatography separation component.

The present systems and methods are well suited for incorporation of ion mobility detection. In some embodiments, for example, the real time analyzer comprises an ion mobility spectrometer. In some embodiments, for example, the ion mobility spectrometer comprises: an inlet for introducing the contaminants into an ionization region of the spectrometer; the ionization region provided in fluid communication with the inlet and having an ionization source for generating analyte ions from the one or more analytes; a separation region in fluid communication with the ionization region for receiving and separating the analyte ions on the basis of ion mobility; and a detector positioned in fluid communication with the separation region for receiving and detecting the analyte ions separated on the basis of ion mobility. In some embodiments, for example, the ion mobility spectrometer further comprises a source of dopant in fluid communication with the ionization region for providing dopant to the analyzer. In some embodiments, for example, the inlet of the ion mobility spectrometer is a membrane for removing or reducing the concentration of compounds in the fluid that may interfere with the detection of the one or more analytes. In some embodiments, for example, the ion mobility spectrometer further comprises an ion shutter or grid provided between the ionization region and the separation region for introducing the analyte ions into the separation region.

In an embodiment, the real time analyzer comprises an optical particle counter such as a light scattering-based optical particle counter, extinction-based optical particle counter, fluorescence-based optical particle counter, or an interferometric-based optical particle counter The present systems and methods are well suited for use with a range of sampler and sampling systems including impingers, impactors, filters and sorbent tubes.

In some embodiments, for example, the sampler is an impinger. In some embodiments, the impinger is for capture of atomic analytes, molecular analytes, ionic analytes or any combination of these. In some embodiments, the capture of particle analytes.

In some embodiments, for example, the impinger comprises an anion leaching resistant material. In some embodiments, for example, the anion leaching resistant material is resistant to leaching of one or more anions selected from the group of $F^-$, $Cl^-$, $Br^-$, $NO_2^-$, $NO_3^-$, $HPO_4^{-2}$ and $SO_4^{-2}$ upon contact with deionized water. In some embodiments, for example, the anion leaching resistant material is characterized by an anion leach rate in the presence of deionized water less than 0.5 µg L$^{-1}$ week$^{-1}$. In some embodiments, for example, the sampler such as the impinger, impactor, filter or sorbent tube, comprises nylon, high density polyethylene, polyetherimide, polypropylene or polyvinylchloride, or any combinations thereof. In some embodiments, for example, the anion leaching resistant material is not a fluoropolymer. In some embodiments, for example, the anion leaching resistant material does not comprise polytetrafluoroethylene (PTFE) or perfluoroalkoxy alkane (PFA).

In some embodiments, for example, the sampler is a sorbent tube. In some embodiments, for example, the sorbent tube comprises a sorbent tube medium selected from the group consisting of one or more materials selected from the group consisting of: activated carbon, silica gel, a polymer material, Tenax, Amberlite, XAD, Polyurethane Foam and any combinations of these.

In an embodiment, the sampler is an impactor, for example, for collecting, capturing or analyzing analytes comprising particles in the fluid, including for example biological particles and/or non-biological particles. In an embodiment, the impactor comprises: (i) a sampling head comprising one or more intake apertures for sampling the fluid; and (ii) an impactor base operationally connected to receive at least a portion of the fluid from the sampling head; the impactor base comprising an impact surface for receiving at least a portion of analytes comprising particles in the fluid and an outlet for exhausting the fluid. In an embodiment, the impactor base further comprises a growth medium positioned to receive the particles in the fluid, wherein the impact surface is a receiving surface of the growth medium. In an embodiment, the intake apertures of the sampling head comprise a plurality of slits or holes provided in a preselected pattern. In an embodiment, the sampling head and the impactor base engage so as to provide the impact surface at a preselected distance from the intake apertures of the sampling head to allow for collection of at least 50% of the particles having cross sectional dimensions greater than or equal to 0.5 µm.

In an embodiment, the sampler is a filter, for example, a membrane including polymer, metallic and ceramic membranes or combinations thereof.

In some embodiments, the system further comprises a processor (e.g. hardware or software implemented) operationally connected to the real time analyzer and flow system, such that the processor receives and analyzes output from the real time analyzer to determine if the conditions one or more real time monitoring analyte detection criteria is met, wherein the process is configured or programmed to trigger or otherwise control the fluid system so as to initiate sampling of the fluid by the sampler upon a determination that the conditions one or more real time monitoring analyte detection criteria has been met. The methods and systems of the invention may use flow systems and processors including hardware implemented and/or software implemented processors, for triggering, controlling and actuating sampling. In some embodiments, for example, the flow system comprises one or more valves and/or fluid actuators operationally connected to the sampler for directing fluid to the sampler for sampling. In some embodiments, for example, the valves or fluid actuators may optionally comprise one or more solenoid valves, pneumatic valves, conduits, pumps, blowers, fans or any combination of these. In some embodiments, for example, the flow system is operationally connected to the real time analyzer and/or one or more processors to provide triggered sampling and/or controlled sampling, such as being in one-way or two-way communication. In some embodiments, for example, the present system may further comprise a processor configured to receive signals from the real time analyzer, or derived from the real time analyzer, and configured to send a trigger, control or actuation signal to the flow system to initiate directing the fluid from the sample, process or environment undergoing monitoring to the sampler for sampling. In some embodiments, for example, the processor compares the signals from the real time analyzer and identifies a detection event when the signals are equal to or greater than a threshold value, optional meeting the one or more real time analyzer analyte detection criteria such as one or more of a threshold concentration of analyte, a threshold amount of analyte, a threshold frequency of detection of analyte, a threshold number of counts of analyte per unit time and an analyte composition; wherein the processor sends the trigger, control or actuation signal to the flow system upon identification of a detection event, for example a detection event meeting the one or more real time analyzer analyte detection criteria.

The present systems and methods are versatile and thus support monitoring analytes in a wide range of applications. In some embodiments, the fluid is a gas or mixture of gases including one or more process gases, for example, for microelectronic and/or aseptic process applications. In some embodiments, for example, the one or more analytes are one or more acids such as HF, HCl, HBr, $HNO_3$, $H_2SO_4$, $H_3PO_4$, HCOOH and $CH_3COOH$, or any combination of these. In some embodiments, for example, the one or more analytes are one or more bases such as $NH_3$, methylamine, dimethylamine, ethylamine and N-methyl-2-pyrrolidone, or any combination of these. In some embodiments, for example, the one or more analytes are one or more volatile organic compounds such as $CH_3OH$, isopropyl alcohol, propylene glycol monomethyl ether acetate (PGMEA), and hexamethyl disilazane, or any combination of these. In some embodiments, for example, one or more analytes are one or more contaminants. In some embodiments, the one or more analytes are one or more particles such as particles characterized by dimension, such as effective diameter, greater than 20 nm, optional greater than 50 nm, optionally greater than 100 nm and optionally greater than 500 nm, optionally from 0.1-100 µm, and optionally for some applications ranging from 0.5-15 µm. In some embodiments, the one or more analytes are one or more particles such as particles, such as biological particles. In some embodiments, the one or more analytes are one or more particles, wherein the impinger, impactor, filter or sorbent tube is analyzed to determine if the particles are biological particles or nonbiological particles.

In another aspect, provided are an impinger systems for sampling a gas, the system comprising: (i) an inlet for sampling the gas; and (ii) a sampler reservoir containing deionized water for receiving gas from the inlet, wherein the reservoir comprises an anion leaching resistant material characterized by an anion leach rate in the presence of deionized water less than 0.5 µg $L^{-1}$ $week^{-1}$. In some embodiments, for example, the anion leaching resistant material is resistant to leaching one or more anions selected from the group of $F^-$, $Cl^-$, $Br^-$, $NO_2^-$, $NO_3^-$, $HPO_4^{-2}$ and $SO_4^{-2}$ upon contact with deionized water. In some embodiments, for example, the anion leaching resistant material comprises nylon, high density polyethylene, polyetherimide, polypropylene or polyvinylchloride, or any combinations thereof. In some embodiments, for example, the anion leaching resistant material is not a fluoropolymer. In some embodiments, for example, the anion leaching resistant material does not comprise PTFE or PFA. In some embodiments, for example, the inlet is an orifice provided at the bottom of the reservoir, wherein the orifice allows gas to bubble through the reservoir. In some embodiments, for example, the inlet is pressurized so as to prevent the deionized water from being transported through the orifice and away from the reservoir.

In another aspect, provide are monitoring systems comprising: (i) a real time analyzer for monitoring one or more analytes in a fluid, such as a gas or liquid from a sample, process or environment undergoing monitoring; (ii) an impinger comprising: (1) an inlet for sampling the gas; and (2) a sampler reservoir containing deionized water for receiving gas from the inlet, wherein the reservoir comprises an anion leaching resistant material characterized by an anion leach rate in the presences of deionized water less than or equal to less than 0.5 $\mu g\ L^{-1}\ week^{-1}$; and (iii) a flow system operably connected to the real time analyzer and the impinger; wherein the flow system is configured such that upon detection of the one or more analytes in the fluid by the real time analyzer, optional meeting the one or more real time analyzer analyte detection criteria such as one or more of a threshold concentration of analyte, a threshold amount of analyte, a threshold frequency of detection of analyte, a threshold number of counts of analyte per unit time and an analyte composition, the flow system directs fluid from the sample, process or environment undergoing monitoring to the impinger for sampling; wherein upon detection of the one or more analytes meeting the one or more real time analyzer analyte detection criteria, a trigger signal or other actuation mechanism for initiating the flow system directing the fluid to the sampler for sampling is provided and triggers the flow system to direct the fluid to the sampler for sampling.

In an aspect, the invention provides methods of monitoring analytes in a fluid, such as a gas or liquid from a sample, process or environment undergoing monitoring; wherein a real time analyzer analyzes the fluid for the presence of analytes, wherein output from the analyzer provides the basis of triggering for a sampler, such as via a flow control system that is configured to direct fluid to a sampler for collection, capture and/or transformation of analytes upon a detection event by the real time analyzer.

In another aspect, provide are methods for monitoring one or more analytes in a fluid comprising: (i) providing a monitoring system comprising (1) a real time analyzer for monitoring one or more analytes in the fluid, such as a gas or liquid from a sample, a process or an environment undergoing monitoring; (2) a sampler comprising an impinger, impactor, filter or sorbent tube; (ii) monitoring the analytes in the fluid using the real time analyzer; and (iii) sampling fluid from the sample, process or environment undergoing monitoring using the sampler upon detection of the one or more analytes by the real time analyzer, for example, detection of the one or more analytes meeting one or more real time analyzer analyte detection criteria, optionally further comprising triggering the sampling step upon detection of the analyte by the real time analyzer meeting the one or more real time analyzer analyte detection criteria; wherein the real time analyzer analyte detection criteria is one or more detection events characterized by or exceeding one or more of: a threshold concentration of analyte, a threshold amount of analyte, a threshold frequency of detection of analyte, a threshold number of counts of analyte per unit time, a composition of analyte or any combination of these, and wherein optionally fluid from the sample, process or environment undergoing monitoring is directed to the sampler for a selected duration and/or at a selected rate so as to allow subsequent analysis of analytes sampled by the sample. In an embodiment, the method further comprises providing a signal from output of the real time detector, or derived from output of the real time detector, to trigger the step of sampling fluid using the sampler upon detection of the one or more analytes by the real time analyzer, for example using a processor.

In some embodiments, for example, the sampler samples fluid from the sample, process or environment undergoing monitoring upon detection of the one or more analytes characterized by a concentration greater than or equal to a threshold concentration. In some embodiments, for example, the sampler samples fluid from the sample, process or environment undergoing monitoring for at least as long as the real time analyzer detects the one or more analytes. In some embodiments, for example, the sampler samples fluid from the sample, process or environment undergoing monitoring for a predetermined time upon detection of the one or more analytes. In some embodiments, for example, the system further comprises a flow system operably connected to the real time analyzer and the sampler; wherein the flow system is configured such that upon detection of the one or more analytes in the fluid by the real time analyzer, for example meeting one or more real time analyzer analyte detection criteria, the flow system directs fluid from the sample, process or environment undergoing monitoring to the sampler for sampling. In some embodiments, for example, the system further comprises a processor configured to receive a signal from the real time analyzer and configured to send a trigger signal to the flow system, or otherwise initiate an actuation mechanism, to initiate directing fluid from the sample, process or environment undergoing monitoring to the sampler for sampling. In some embodiments, for example, the real time analyzer comprises an ion mobility spectrometer and/or an optical particle counter. In some embodiments, for example, the sampler comprises an impinger comprising an anion leaching resistant material characterized by an anion leach rate in the presences of deionized water less than 0.5 $\mu g\ L^{-1}\ week^{-1}$. In some embodiments, for example, the sampler comprises nylon, high density polyethylene, polyetherimide, polypropylene or polyvinylchloride, or any combinations thereof. Methods of the invention may further comprise analyzing the impinger, impactor, filter or sorbent tube, or a component or material thereof such as the impinger media, impactor surface, filter surface or sorbent tube media, so as to identify, detect and/or characterize captured or collected analytes. In an embodiment, the method further comprises analyzing the impinger, impactor, filter or sorbent tube to identify or characterize the analyte, such as the composition, concentration, viability and/or amount of analyte. In an embodiment, the method further comprises analyzing the impinger, impactor, filter or sorbent tube to determine the composition or concentration of the analyte. In an embodiment, the method further comprises culturing, propagating and/or growing particles collected or captured by the impinger, impactor, filter or sorbent tube to determine if the particles are biological particles, for example via visualization, counter and/or optical analysis of cultured particles.

In an embodiment, a trace gas monitoring system comprises: (i) a real time analyzer comprising an ion mobility spectrometer for monitoring one or more analytes in a fluid, such as a gas or liquid from a sample, a process or an environment undergoing monitoring; wherein the analytes are one or more acids, bases, volatile organic compounds or any combinations of these; (ii) a sampler comprising an impinger or sorbent tube; and (iii) a flow system operably connected to the real time analyzer and the sampler; wherein the flow system is configured such that upon detection of the one or more analytes in the fluid by the real time analyzer, for example meeting one or more real time analyzer analyte detection criteria such as such as one or more of a threshold concentration of analyte, a threshold amount of analyte, a threshold frequency of detection of analyte, a threshold number of counts of analyte per unit time and an analyte composition, the flow system directs fluid from the sample, a process or an environment undergoing monitoring to the sampler for sampling.

In an embodiment, a particle monitoring system comprises: (i) a real time analyzer comprising an optical particle counter for monitoring one or more analytes in a fluid, such as a gas or liquid from a sample, a process or an environment undergoing monitoring; wherein the analytes are particles; (ii) a sampler comprising an impactor; and (iii) a flow system operably connected to the real time analyzer and the sampler; wherein the flow system is configured such that upon detection of the one or more analytes in the fluid by the real time analyzer, for example meeting one or more real time analyzer analyte detection criteria such as such as one or more of a threshold concentration of analyte, a threshold amount of analyte, a threshold frequency of detection of analyte, a threshold number of counts of analyte per unit time and an analyte composition, the flow system directs fluid from the sample, a process or an environment undergoing monitoring to the sampler for sampling.

In an embodiment, a particle monitoring system comprises: (i) a real time analyzer for monitoring one or more analytes in a fluid, such as a gas or liquid from a sample, a process or an environment undergoing monitoring; (ii) a sampler comprising an impinger, impactor, filter or sorbent tube; and (iii) a flow system operably connected to the real time analyzer and the sampler; wherein the flow system is configured such that upon detection of the one or more analytes in the fluid by the real time analyzer meeting one or more real time analyzer analyte detection criteria, the flow system directs fluid from the sample, a process or an environment undergoing monitoring to the sampler for sampling; wherein one or more real time analyzer analyte detection criteria are selected from the group consisting of: a threshold concentration of analyte; a threshold amount of analyte; a threshold frequency of detection of analyte; a threshold number of counts of analyte per unit time; an analyte composition or any combination of these; wherein upon detection of the one or more analytes meeting the one or more real time analyzer analyte detection criteria, a trigger signal or other actuation mechanism for initiating the flow system directing the fluid to the sampler for sampling is provided and the flow system directs fluid to the sampler for sampling.

In an embodiment, a method for monitoring one or more analytes in a fluid comprises: (i) providing a monitoring system comprising: (1) a real time analyzer for monitoring one or more analytes in the fluid, such as a gas or liquid from a sample, a process or an environment undergoing monitoring; (2) a sampler comprising an impinger, impactor, filter or sorbent tube; (ii) monitoring the analytes in the fluid using the real time analyzer; and (iii) sampling the fluid from the sample, a process or an environment undergoing monitoring using the sampler upon detection of the one or more analytes by the real time analyzer, for example meeting one or more real time analyzer analyte detection criteria such as such as one or more of a threshold concentration of analyte, a threshold amount of analyte, a threshold frequency of detection of analyte, a threshold number of counts of analyte per unit time and an analyte composition.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE SEVERAL VIEWS OF THE DRAWING(S)

FIG. 1 provides an example schematic of an airborne molecular contamination monitoring system combining an impinger or sorbent tube sampling device with an IMS analyzer.

Figure 2:
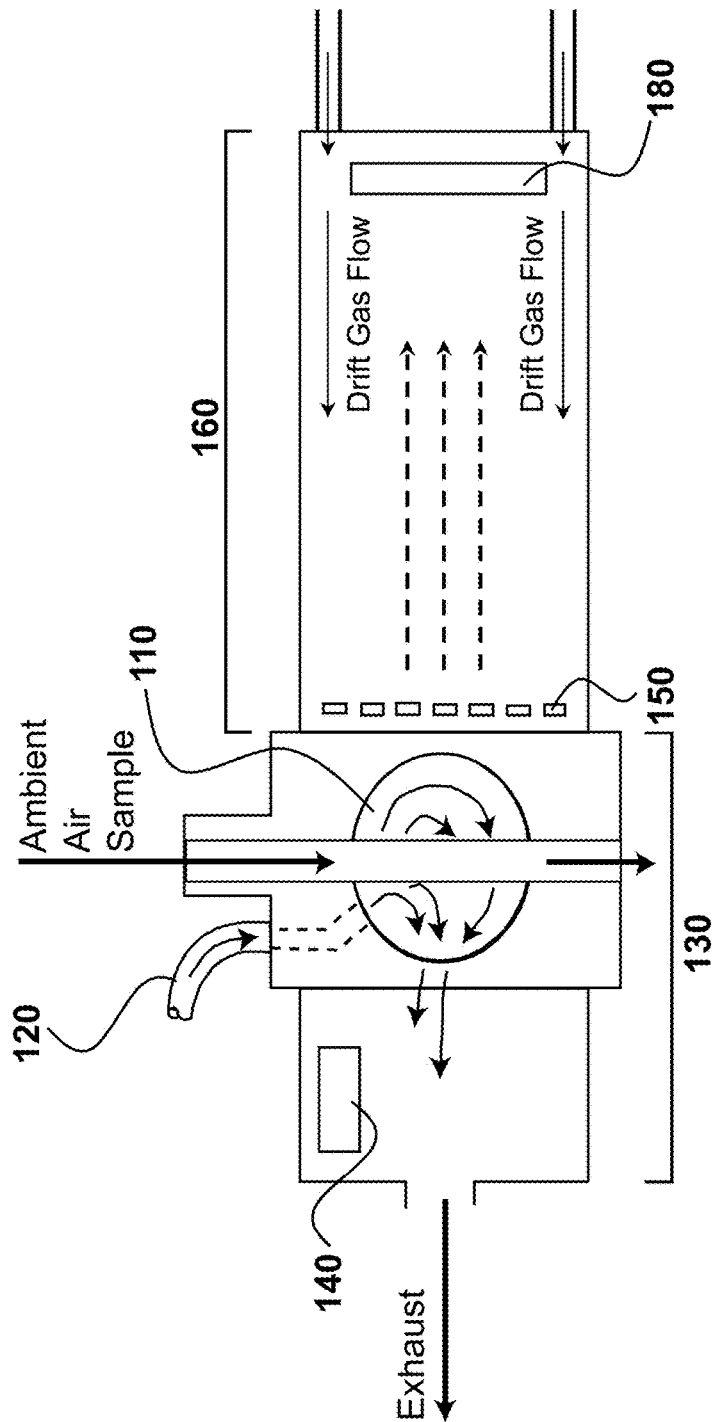

FIG. 2 provides an example schematic of an IMS analyzer that may be used in the airborne molecular contamination monitoring system described herein.

Figure 3:
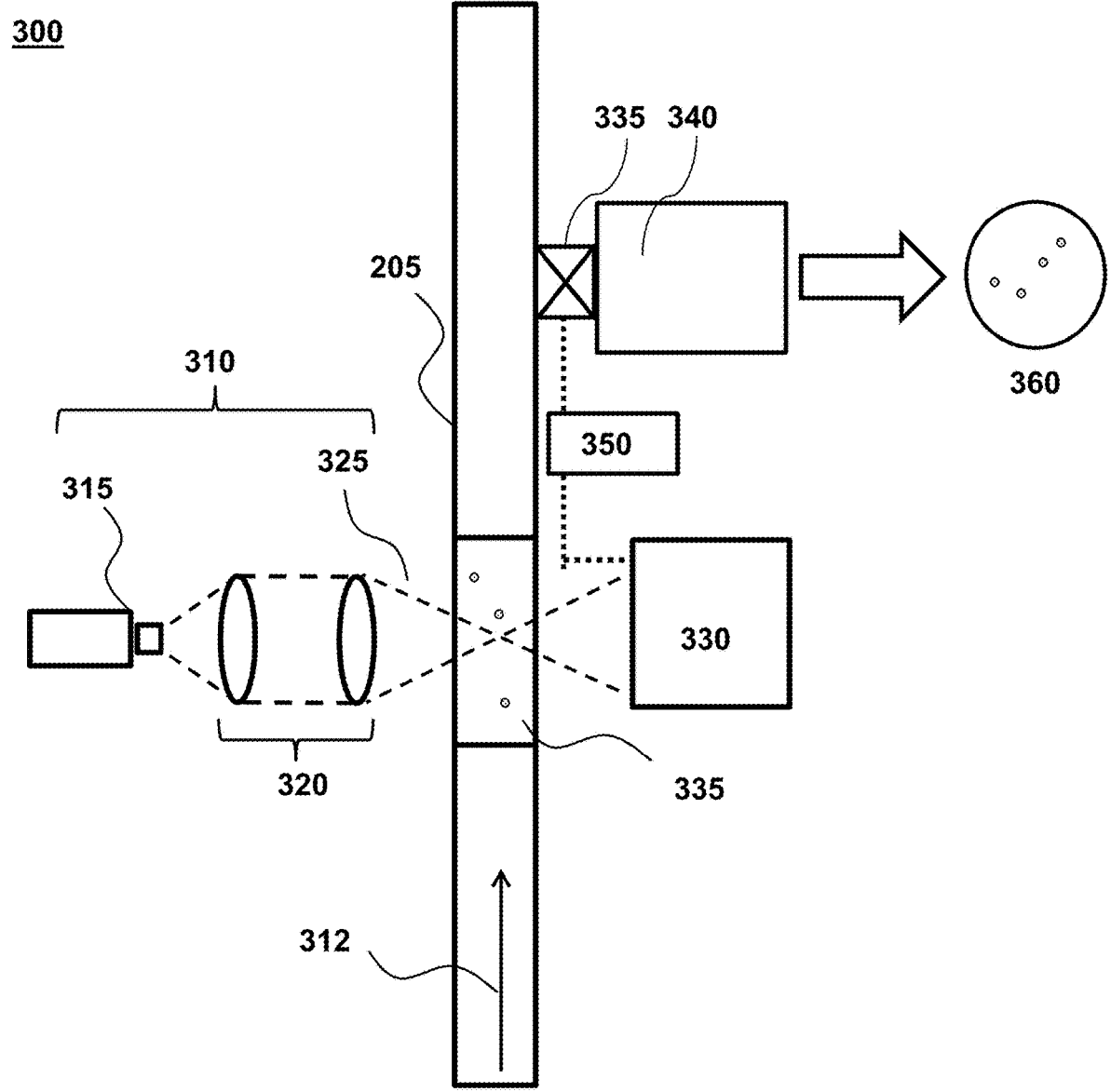

FIG. 3 provides a schematic diagram of a biological particulate analysis system 300 for identification and optionally characterization of biological particle such as viruses, spores and microorganisms including bacteria, fungi, archaea, protists, and other single cell microorganisms.

Figure 4:
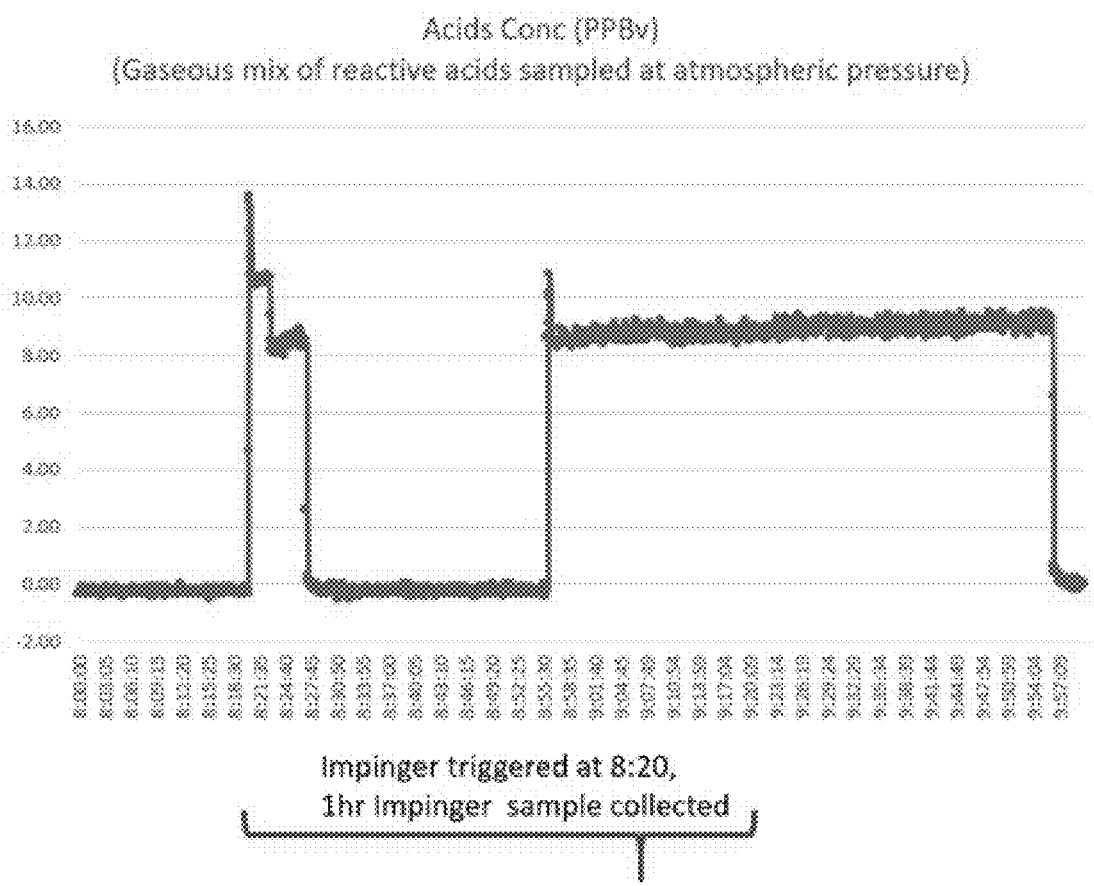

FIG. 4 provides an example of ion mobility spectrometer measurements for a mixture of reactive acids sampled at atmospheric pressure along with impinger sampling results for a triggered 1 hr sampling duration.

Figures 5, 6A:
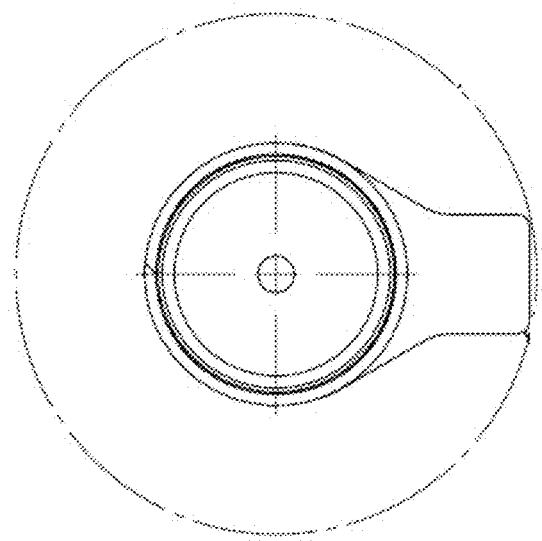
Figure 6B:
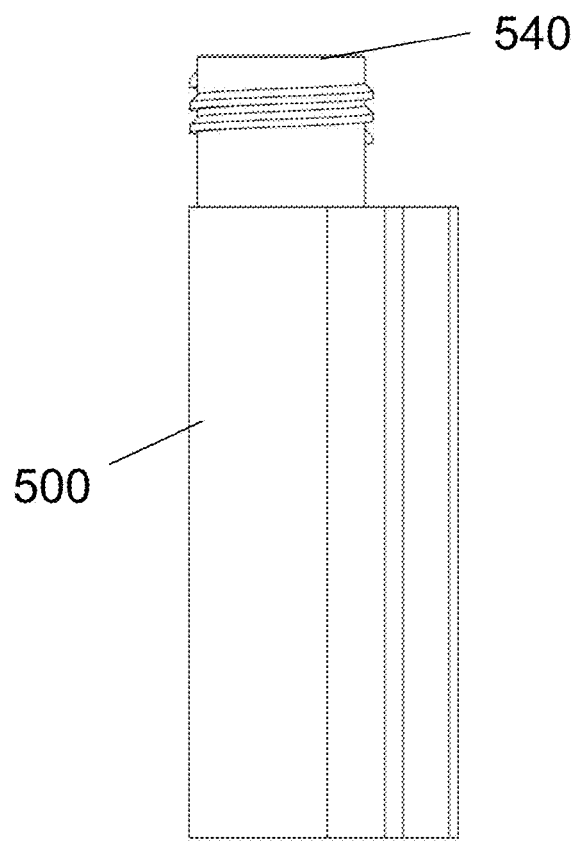
Figure 6C:
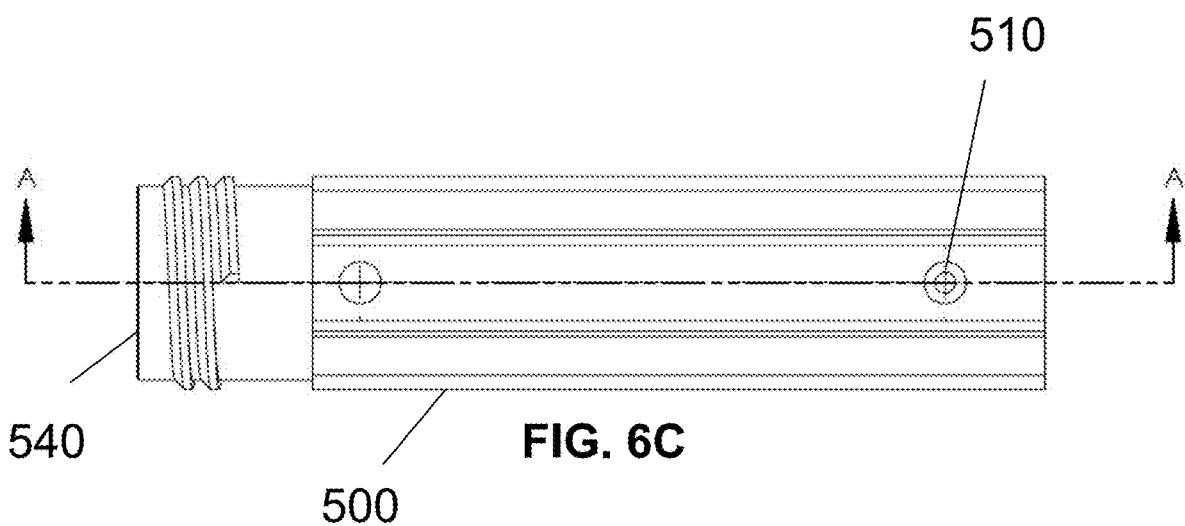
Figure 6D:
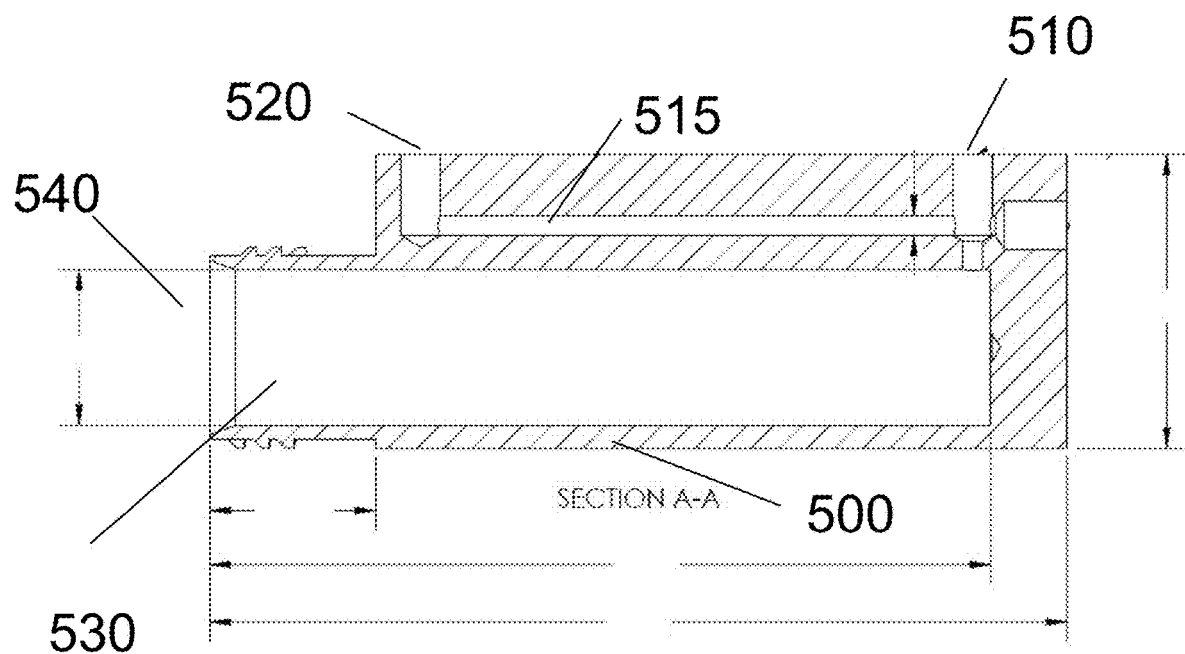
Figure 6E:
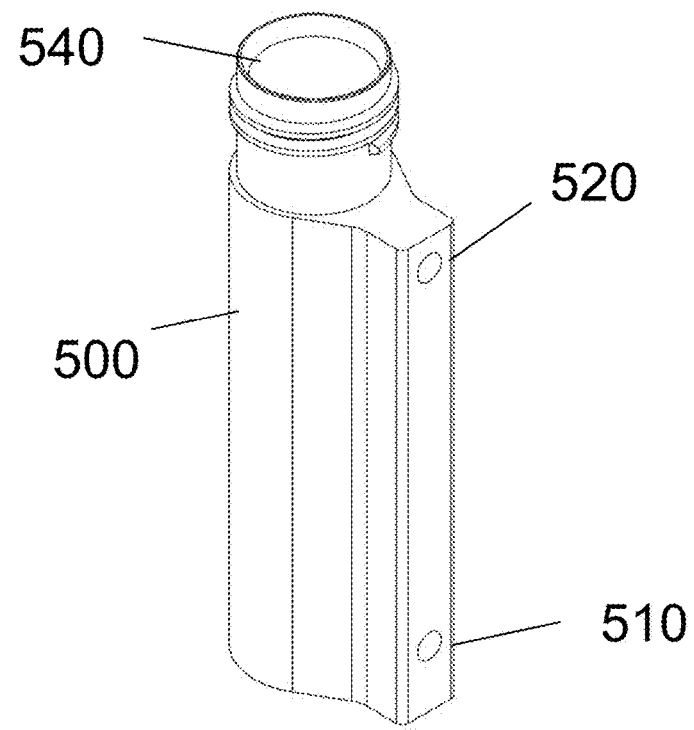

FIG. 5 provides the concentration of a range of different anions for three different materials in the presence of deionized water over a stagnation period of four weeks.

FIGS. 6A-6E provides schematics of an impinger including (6A) top view, (6B) vertical side view, (6C) longitudinal side view, (6D) cut away view and (6E) perspective view.

Figure 7A:
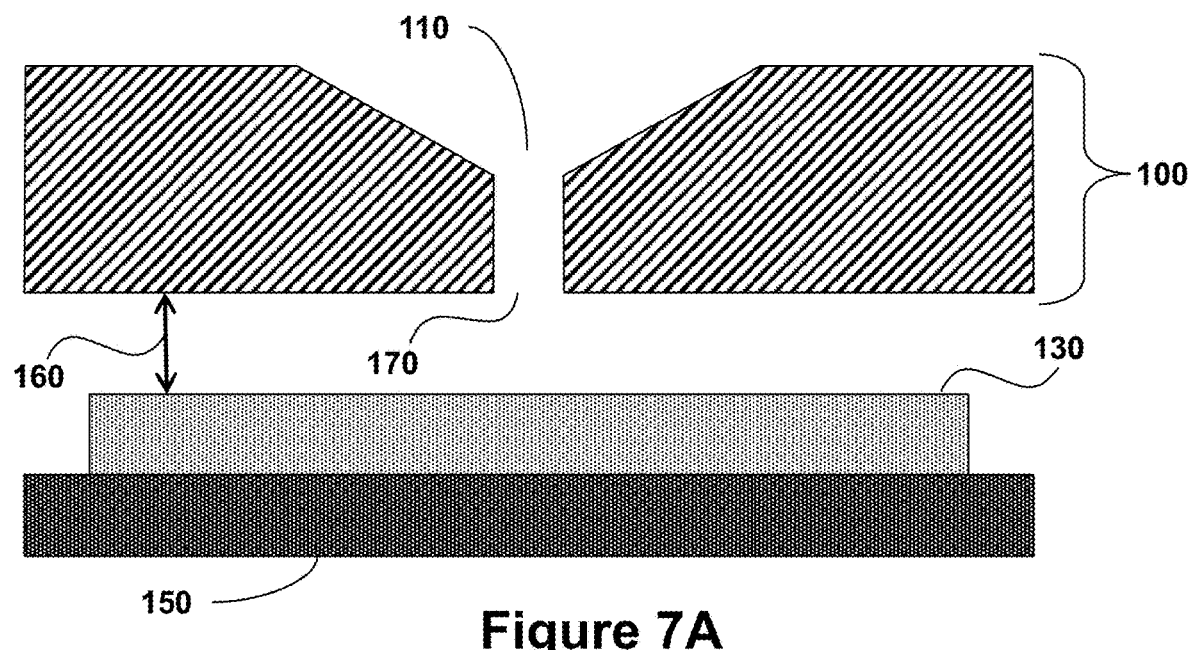
Figure 7B:
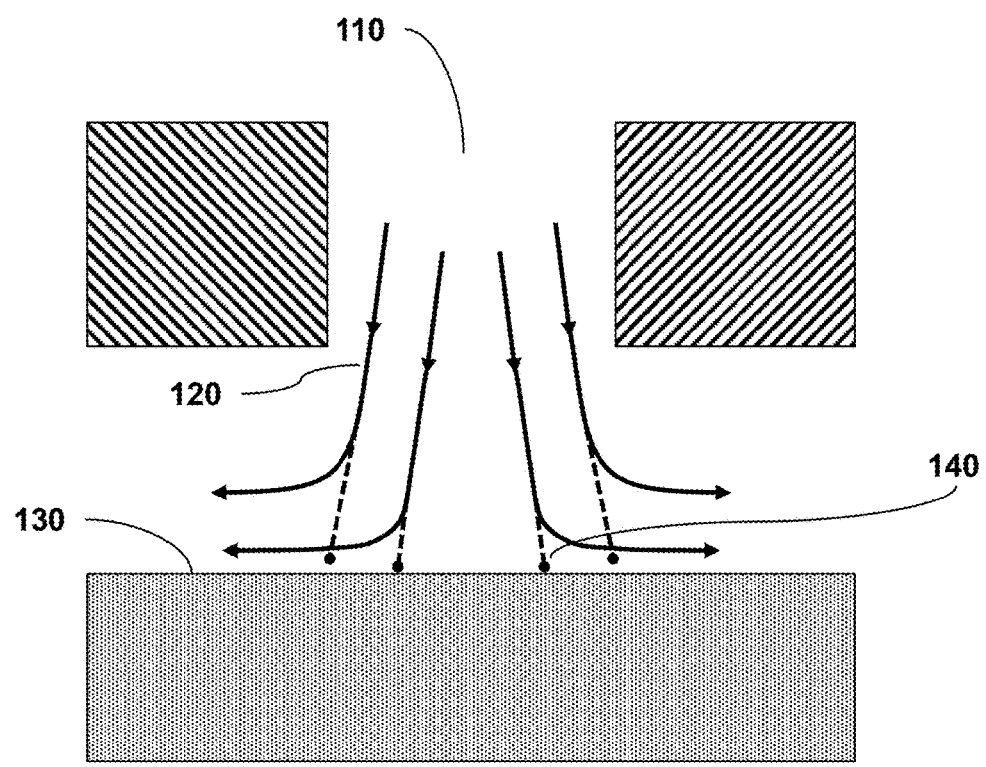

FIG. 7A provides a schematic diagram illustrating the general construction of an impactor for a monitoring system and FIG. 7B illustrates an expanded view of the impactor to further illustrate the operational principal.

DETAILED DESCRIPTION OF THE INVENTION

In general, the terms and phrases used herein have their art-recognized meaning, which can be found by reference to standard texts, journal references and contexts known to those skilled in the art. The following definitions are provided to clarify their specific use in the context of the invention.

As used herein "analyte" refers to one or more species, compositions or materials to be detected and/or analyzed. Analytes may refer to atomic, ionic and molecular species or may refer to particles, including biological and nonbiological particles. In some embodiments, analytes are trace components and/or contaminants of a fluid, such as trace components and/or contaminants of a liquid, a gas or any mixtures thereof, including water, air, solvents, solutions, process liquid chemicals, process gases, gases or liquids from a manufacturing and/or processing environment or process. In an embodiment, analytes are in a fluid undergoing monitoring, such as a gas or liquid from a sample, a process or an environment undergoing monitoring.

As used herein "monitoring one or more analytes in a fluid" refers to one or more processes for analyzing a fluid to determining the presence of one or more analytes in the fluid, such determining the presence of one or more analytes in a flowing fluid. "Monitoring one or more analytes in a fluid" includes detecting, sensing, measuring and/or characterizing analytes, for example, using a real time analyzer capable of detecting, sensing, measuring and/or characterizing in real time. In some embodiments, monitoring one or more analytes in a fluid refers to detecting one or more atomic, ionic or molecular species in a fluid, such as gases, ions, molecules or any combination of these in a fluid, such as a flowing fluid. In some embodiments, monitoring one or more analytes in a fluid refers to detecting one or more particles in a fluid, such as biological and/or nonbiological particles in a fluid, such as a flowing fluid. In some methods and systems, monitoring one or more analytes is used to trigger one or more sampling events, such as sampling using an impinger and/or sorbent tube. In some embodiments, for example, a real time sensor is provided upstream of a sampler, such as a impinger or sorbent tube, and upon detection of an analyte by the real time analyzer, a signal is generated so as to trigger collection and/or analysis via the sampler of a volume of fluid having the detected analyte present. In some embodiments, for example, monitoring one or more analytes using a real time analyzer is used to trigger one or more sampling events such that the sampling event is coincident or proximate in time (e.g. within ±60 sec, optionally ±20 sec, optionally ±10 sec) with detection of an analyte in a flowing fluid sample or such that the sampling event corresponds to a selected time period (e.g. within ±60 sec, optionally ±20 sec, optionally ±10 sec) after the detection of an analyte in the fluid. In some embodiments, for example, monitoring one or more analytes in a flowing fluid using a real time analyzer is used to trigger one or more sampling events corresponding to directing fluid to a sampler for sampling.

As used herein "particles" refers to small objects which are often regarded as trace components and/or contaminants in a fluid sample, such as a flowing fluid. A particle can be a material created by the act of friction, for example when two surfaces come into mechanical contact and there is mechanical movement. Particles can be composed of aggregates of material, such as dust, dirt, smoke, ash, water, soot, metals, oxides, ceramics, minerals, or any combination of these or other materials or contaminants. "Particles" may also refer to biological particles, for example, viruses, spores and microorganisms including bacteria, fungi, archaea, protists, and other single cell microorganisms. In some embodiments, for example, biological particles are characterized by a size dimension (e.g., effective diameter) ranging from 0.1-15 μm, optionally for some applications ranging from 0.5-5 μm. A particle may refer to a small object which absorbs, emits and/or scatters light and is thus detectable by an optical particle counter. As used herein, "particle" is intended to be exclusive of the individual atoms or molecules of a carrier fluid, for example a flowing fluid such as water, air, solvent, solution, process liquid chemicals, process gases, liquids or gases from an ambient environment, liquids or gases from a manufacturing or processing environment, etc. In some embodiments, particles may be initially present on a surface, such as a surface in a cleanroom facility, microfabrication facility, pharmaceutical or biological manufacturing facility, liberated from the surface and subsequently analyzed in a fluid. In some embodiments, for example, particles have a size dimension, such as effective diameter, greater than 5 nm, 10 nm, 20 nm, 30 nm, 50 nm, 100 nm, 500 nm, 1 μm or greater, or 10 μm or greater. Some embodiments, particles have a size dimension, such as effective diameter, selected from 10 nm to 500 μm, optionally for some applications 10 nm to 50 μm, optionally for some applications 10 nm to 1 μm, optionally for some applications 10 nm to 0.5 μm.

As used herein, "impinger" refers to a container, passage or vessel for receiving a fluid, wherein analytes in the fluid are contacted with an impinger medium so as to capture, collect and/or transform analytes. Impingers useful for the present systems and methods may house, or otherwise incorporate, a range of impinger media for capturing, collecting and/or transforming analytes including one or more liquids, solutions, gels and/or sols. In some embodiments, an impinger is a "bubbler," for example, a device in which the fluid flows through the impinger as to agitate or bubble the liquid therein, such as a solution or solvent. In some embodiments, impingers include impinger media comprising a layer, a film, droplets or matrix of liquid, solution, sol and/or gel material. Impingers may be made from anti-leeching materials, to reduce the generation of species that may interfere with subsequent detection and/or analysis of collected, captured or transformed analytes, such as ions, molecules or particle arising from the impinger itself or components thereof.

As used herein, "sorbent tube" refers to a container, passage or vessel for receiving a fluid, wherein analytes in the fluid are contacted with a sorbent tube medium so as to capture, collect and/or transform the analytes. Sorbent tubes useful for the present systems and methods may house, or otherwise incorporate, a range of sorbent tube media for capturing, collecting and/or transforming analytes including one or more solids and/or semi-solids. In some embodiments, sorbent tubes include sorbent tube media comprising granular, porous, foam, particulate, membrane and/or polymeric materials. Sorbent tubes may be made from anti-leeching materials, to reduce the generation of species that may interfere with subsequent detection and/or analysis of collected, captured or transformed analytes, such as ions, molecules or particle arising from the sorbent tube itself or components thereof. Impingers and sorbent tubes of some embodiments are made from anion leech resistant materials, including nylon, high density polyethylene, polyetherimide, polypropylene or polyvinylchloride. Impingers for some application contain deionized water.

"Impactor" refers to a device for sampling particles. In some embodiments, an impactor comprises a sample head including one or more intake apertures (e.g., holes or slits) for sampling a fluid flow containing particles, whereby at least a portion of the particles are directed onto an impact surface for collection, such as the receiving surface of a growth medium (e.g., culture medium such as agar, broth, etc.) or a substrate such as a filter or polymer substrate. Impactors of some embodiments, provide a change of direction of the flow after passage through the intake apertures, wherein particles having preselected characteristics (e.g., size greater than a threshold value) do not make the change in direction and, thus, are received by the impact surface.

The invention includes triggered impingers, impactors, filters and sorbent tubes, wherein timing of contact between the fluid and impinger medium, impact surface or sorbent tube medium is coincident with, or a preselected time after, an event such as a detection event provided by a real time detector and/or occurs for a preselected duration after an event such as a detection event provided by a real time detector. In some embodiments, interaction of the analyte and the impinger medium of the impinger, impact surface of the impactor, surface of the filter or the sorbent tube medium of a sorbent tube is useful for collecting and/or capturing analytes corresponding to trace components and/or contamination from a fluid such as particles, molecules, ions, atoms, free radicals, clusters or other forms of, including water, air, solvents, process liquid chemicals, process gases, gases or liquids from a manufacturing and/or treatment environment or process. Capture, collection and/or transformation achieved using an impinger, impactor, filter or sorbent tube may occur through a variety of chemical and physical processes including absorption, adsorption sorption uptake, association, dissolution, and chemical reaction, of the analyte. In some embodiments, impingers, impactor, filter and sorbent tubes, or components thereof, may be later analyzed through a range of analytical methods for characterization of the captured species, wherein analysis may include extraction, separation or detection of the captured species through various methods known in the art.

Impingers, impactors, filters and sorbent tubes are useful for sampling fluids so as to provide for analysis of analytes in a fluid via a range of techniques including separation, characterization, culturing and growth, and detection techniques, for example, via subsequent analysis of the impinger media, impactor surface, filter surface or sorbent tube media via chemical, physical and/or biological techniques. Impingers, impactors, filters and sorbent tubes are useful in some embodiments for collecting or capturing analytes, such as analytes in the impinger media, impactor surface, filter surface or sorbent tube media. Impingers, impactors, filters and sorbent tubes are useful in some embodiments for physically and/or chemically transforming analytes into detectable species, compositions and/or materials. Impingers, impactors, filters and sorbent tubes are useful in some embodiments for sensing, detecting and analyzing analytes, or byproducts thereof, such as analytes in a fluid. Impingers, impactors, filters and sorbent tubes, including components and materials thereof, may be analyzed during and after exposure to a fluid to detect and/or characterize captured, collected and/or transformed analytes through a variety of methods including chromatography (e.g., gas or liquid chromatography), mass spectroscopy, optical analysis (e.g., fluorescence, spectroscopy, absorption, scattering, etc.), electrochemical analysis, culturing, acoustic analysis, thermal analysis, etc. In some embodiments, the impinger, impactor, filter or sorbent tube converts an analyte into a detectable species, such as a detectable ionic or molecular species, that is subsequently analyzed via a mass spectrometry technique, optical technique, electrochemical technique and/or acoustic technique. In some embodiments, the impinger, impactor, filter or sorbent tube collects or captures an analyte for subsequent analysis via a separation technique, such as a chromatographic separation, for example HPLC separation. In some embodiments, the impinger, impactor, filter or sorbent tube collects or captures a particle analyte for subsequent determination as to whether or not the particle is a biological particle or a nonbiological particle, for example, via fluorescence analysis and/or via incubation, culturing and/or growth follow by subsequent analysis by visualization, counting and optical analysis. Analysis of a sampler such as an impinger, impactor, filter or sorbent tube, may optionally include growth of viable biological particles, for sample, via an incubation process involving a growth medium.

"Ion Mobility Spectrometer" or "IMS" refers to an analytic device that separates ions in a carrier gas based on ion mobility and is useful in the detection of airborne molecular contamination. Example of IMS systems and applications can be found in U.S. Pat. Nos. 5,095,206; 5,491,337 and 6,225,623, which are hereby incorporated by reference in their entirety. IMS is useful for the detection of vapors from substances such as alkaloids, other drugs and controlled substances, explosives, contaminants associated with manufacturing processes including but not limited to chemical processing and refining, semiconductor or pharmaceutical manufacture.

"Flow system" refers to any system for transporting, allowing and/or restricting the flow of the fluid sample being analyzed to and from a sampler such as an impinger or sorbent tube. In an embodiment, the flow system is in fluid communication with the fluid undergoing monitoring, for example via a value, actuator, conduit, pump, blower, fan or any combination of these, such the flow system is capable of isolating fluid from the sampler and is capable of directing fluid to a sampler, for example, upon detection of said one or more analytes in said fluid by said real time analyzer meeting one or more real time analyzer analyte detection criteria such as such as one or more of a threshold concentration of analyte, a threshold amount of analyte, a threshold frequency of detection of analyte, a threshold number of counts of analyte per unit time and an analyte composition. For example, the flow system may be any type of valve (e.g. pneumatic, solenoid, ball, pinch, needle, etc.), fluid actuator, or a system such as a manifold and series of valves, actuators, conduits, pumps, blowers, fans and any combination of these. The flow system may provide isolation of the sampler, such as impinger, membrane, impactor and/or sorbent tube by prevent the flow of fluid into the sampler. In some embodiments, the flow system may allow for flow, passage, direction and/or injection a fluid undergoing monitoring, such as a gas or liquid from a sample, a process or an environment undergoing monitoring, such that it is sampled by the sampler. The flow system may be electronic, mechanical, pneumatic, hydraulic, fluidic, optical a combination thereof, or any other means of process control known in the art.

"Ion" refers generally to multiply or singly charged atoms, molecules, macromolecules having either positive or negative electric charge and to complexes, aggregates, clusters or fragments of atoms, molecules and macromolecules having either positive or negative electric charge. Ions are generated as described herein either directly or indirectly from an ionization means (e.g. a $Ni^{63}$ source).

"Analyte ion" or "detectable ion" refers to ions derived from analytes of interest in a gas phase sample that are capable of separation on the basis of mobility under an applied electric field, and detected so as to characterize the identity and/or concentration of the analytes in the sample. Analyte ions are formed in the present invention via one or more processes occurring in an ionization region of an IMS analyzer including direct ionization processes and ion-molecule and ion-ion reactions involving analyte of interest, dopant, dopant ions, and reactant ions generated from the ionization of carrier gases, drift gases) and/or dopant gases. In some embodiments, detectable ions are formed via associative reactions (e.g., adduct formation, cluster formation, etc.) involving analytes and/or ions thereof and dopants and ions thereof. Ion may also refer to an electrically charged dopant—analyte complex, such as a negatively charged dopant—analyte complex or a positively charged dopant-analyte complex.

"Dopant" refers to compounds that are added to an IMS analyzer to suppress formation of unwanted peaks detected by the IMS. A dopant can be capable of adjusting the flight times of ions. The dopants may also be useful for facilitating charge transfer in the separation region and maintaining ion clusters as the clusters travel in the separation region.

"Fluid communication" refers to the configuration of two or more elements such that a fluid (e.g., a gas or a liquid) is capable of flowing from one element to another element. Elements may be in fluid communication via one or more additional elements such as tubes, cells, containment structures, channels, valves, actuators, fans, blowers, pumps or any combinations of these. For example, an ionization and separation region are said to be in fluid communication if at least a portion of dopant, drift gas and ions are capable of transiting from one region to the other. In certain aspects, this fluid communication is one-way (e.g., drift gas traveling from the separation to the ionization region).

FIG. 1 provides a schematic diagram of an airborne molecular contamination monitoring system 100. A real time analyzer comprising an ion mobility spectrometer (IMS) 200 monitors a fluid sample for analytes, such as gas phase trace components and/or contaminants in a fluid flow 210 (schematically depicted as an arrow). In some embodiments, for example, fluid flow 210 comprise ambient air, one or more process gases, gases from a manufacturing or processing environment or any combination of these.

Upon detection of an analyte via the IMS 200 meeting one or more detection criteria such as an analyte amount, analyte concentration, and/or analyte counts per unit time threshold, a flow control system 300 in operational communication with IMS 200 operates to allow fluid from the sample, process or environment undergoing monitoring to interact with an impinger or sorbent tube 400, for example, via triggering or actuation of a valve or a manifold for providing fluid to the impinger or sorbent tube 400. The impinger or sorbent tube 400 is in fluid communication with a flow control system 300 for receiving fluid from the sample, process or environment undergoing monitoring and contains a sorbent material 401, for example, such as a liquid, solution, solid, gel or sol sorbent material that interacts with the analyte, or a byproduct thereof, in the fluid provided to the impinger or sorbent tube 400. In embodiments, the impinger or sorbent tube 400 is capable of collecting, capturing and/or chemically or physically transforming analytes in the fluid for subsequent identification, analysis and/or characterization, such as via one or more separation techniques (e.g., chromatographic separation) and/or chemical or physical analysis techniques (e.g., via mass spectrometry, optical analysis, electrochemical analysis or any combination of these). Triggering and/or actuation of the flow control system 300 may involve a processor 410 operationally connected to receive signals derived from ion mobility spectrometer (IMS) 200 and send a trigger signal to flow control system 300, thereby actuating sampling of the fluid by impinger or sorbent tube 400. In some embodiments, for example, collection, capture and/or transformation provided by the impinger or sorbent tube 400 is triggered via a detection event determined by ion mobility spectrometer (IMS) 200, such as meeting one or more analyte detection criteria such as an analyte amount, analyte concentration, and/or analyte counts per unit time threshold, thus, the fluid component sampled by impinger or sorbent tube 400 corresponds to conditions of the fluid for the detection event, such as the fluid sampled, sampling conditions, volume of fluid and/or timing corresponding to the detection event. In this manner the information obtained by sampling of the impinger or sorbent tube 400 and/or subsequent analysis may be directly attributed to sampling conditions corresponding to the detection event by the ion mobility spectrometer (IMS) 200, thus providing sampling useful for evaluating potential implications and/or consequences of a detection event, for example, implications or consequences for a manufacturing or processing environment undergoing monitoring.

FIG. 2 provides a schematic diagram illustrating an example ion mobility spectrometry analyzer 200 for the detection of analytes, such as airborne molecular contamination as described herein. As shown in FIG. 2, IMS analyzer 100 comprises hydrophobic membrane 110, ionization region 130 including an ionization source 140, source of dopant 120, separation region 160 and ion detector 180. These elements of the present analyzer are provided in fluid communication with each other such that analytes, such as contamination, in the ambient air sample are introduced to IMS analyzer 100 via membrane 110, and undergo ionization in the ionization region 130 via the ionization source 140 capable of generating ionizing radiation, so as to generate analyte ions that are subsequently separated in the separation region 160 on the basis of mobility and detected via ion detector 180. In an alternative embodiment, an inlet is provided in fluid communication with ionization region 130, source of dopant 120, separation region 160 and/or ion detector 180 that does not have a membrane component.

FIG. 3 provides a schematic diagram of a biological particle analysis system 300 for identification, and optionally characterization, of biological particles, such as viruses, spores and microorganisms including bacteria, fungi, archaea, protists, and other single cell microorganisms. As shown in FIG. 3, a real time analyzer comprising an optical particle counter 310 monitors a fluid flow 312 (schematically depicted as an arrow), for example, air, water, solvent, solution, gas or liquid from a manufacturing or processing environment, for the presence of analytes. In some embodiments, optical particle counter 310 is a light scattering-based optical particle counter, extinction-based optical particle counter, fluorescence-based optical particle counter, an interferometric-based optical particle counter or any combination of these. In an embodiment, for example, the analyte corresponds to particles characterized by a composition attribute and/or size attribute, such as a size dimension (e.g., effective diameter) ranging from 0.1-10 μm, optionally for some applications ranging from 0.5-5 μm.

In the embodiment shown in FIG. 3, optical particle counter 310 comprises optical source 315 and beam steering and/or shaping optics 320 for generating optical beam 325 which is directed to flow cell 335 having said particles (schematically depicted by circles in flow cell 335). Electromagnetic radiation scattered and/or emitted by particle(s) in the fluid flow and/or electromagnetic radiation transmitted by said flow cell is subsequently detected by optical detector 330, so as to monitor, detect and/or characterize analytes comprising particles in the fluid flow 312 (schematically illustrated by circles in flow cell 335). Upon detection of one or more particles via the optical particle counter 310, for example, upon detection of particles meeting one or more detection criteria such as an amount, concentration, and/or counts per unit time threshold, a flow control system 335 operates to allow fluid to interact with an impactor 340, for example, via triggering or actuation of a valve or a manifold providing fluid from the sample, process or environment undergoing monitoring to impactor 340.

The impactor 340 includes an impactor surface, such as the surface of a culture medium (e.g., agar), filter or polymer substrate, capable of collecting, capturing and/or chemically or physically transforming particles in the fluid. Triggering and/or actuation of the flow control system 300 may involve a processor 350 operationally connected to receives signals from the optical particle counter 310 and send a trigger signal to flow control system 335. In some embodiments, for example, collection, capture and/or transformation provided by the impactor 340 is triggered via a detection event corresponding to detection of a particle(s) by optical detector 330, such as detection meeting one or more analyte detection criteria such as analyte amount, analyte concentration and/or analyte counts per unit time, and, thus, the fluid component sampled by the impactor 400 corresponds to conditions of the fluid sample for the detection event, such as the fluid sampled, sampling conditions, volume of fluid and/or timing corresponding to the detection event. In this manner the results of sampling by the impactor 340 and/or subsequent analysis may be directly attributed to sampling conditions corresponding to the detection event by optical detector 330, thus providing information useful for determining the implications and consequences of detection event, for example, implications for a manufacturing or processing environment undergoing monitoring.

In an embodiment, for example, impactor 340 collects, captures and/or chemically or physically transforms the particles for analysis such as a determination of whether the particle is a biological particle or a nonbiological particle and/or characterization of the type and composition of a biological particle. Analysis techniques useful for particles collected, captured and/or transformed by impactor 340 includes fluorescence detection and characterization of endogenous fluorophores in biological particles and/or the use of optical probes or tags, such as fluorescence probes or tags and/or absorption probes or tags, selective for biological particles including selective for specific categories of biological particle such as viruses, spores and microorganisms including bacteria, fungi, archaea, protists, and other single cell microorganisms. In some embodiments, particles collected or captured by impactor 340 are subsequently cultured in petri dish 360, and optionally stained, tagged or otherwise labelled, for example, for subsequent analysis via visualization, counting or optical analysis. In some embodiments, particles collected or captured by impactor 340 are subsequently analyzed by a PCR-based measurement to determine the type and/or composition of biological particle.

The following examples further illustrate the invention but, of course, should not be construed as in any way limiting its scope.

Example 1: Triggered Impinger and Sorbent Tube Sampling from or in Conjunction with IMS Impinger sampling is an approach for of airborne molecular contamination monitoring (AMC) monitoring. The impinger sampling process involves pulling air or gas samples through an absorbent media (liquid or granular) for a time sufficient to collect detectable quantities of the contaminants of interest. The exposed impinger or media is subsequently analyzed, for example, via an off-line laboratory analysis.

The benefits and weaknesses of impinger sampling are:
Benefits
Low initial capital costs
Support contamination species identification via offline lab testing
Weaknesses
Does not provide real-time, specific actionable data to identify problems quickly
Sampling initiated by schedule may or may not detect an event resulting in inefficiencies Described in this Example is an impinger/sorbent tube system coupled with an IMS analyzer (for example, Particle Measuring Systems® AirSentry® II) in conjunction with control software to initiate impinger sampling upon identification of an event, such as detection of a contaminant, by the IMS analyzer. This configuration is useful to provide impinger/sorbent tube sampling only carried out during or proximate to a detection event, such as conditions characterized by the present of one or more contaminants or other target analyte(s), which saves both time and money.

Example 2: Use of Anion Leaching Resistant Materials for Fabrication of Impingers for Measuring Sub-Ppb Concentrations of Molecular Contamination, while Providing Long Shelf Life High purity fluorocarbon materials such as PTFE and PFA are commonly used for handling high purity chemicals due to their inertness and low levels of metallic impurities. However, over long periods of time, these materials can leach low levels of fluoride ions into the solution contacting their surfaces. In most flowing applications, the quantity of fluoride ions leaching into solution is far below analytical detection methods. In the case of certain triggered impinger systems described herein, the impinger may sit filled with deionized water for a period of months before being used to collect an air sample. Internal testing has found that over time spans of days to weeks to months, PTFE and PFA may leach unacceptable levels of fluoride ions into the deionized water. The net result of this leaching may be high background F-ion concentrations which may be interpreted as a false positive for the presence of HF in the air sample. The levels from leaching could frequently exceed the F-ions collected in the air sample.

Anion leaching resistant materials of certain embodiments do not leach anions at appreciable levels which could be construed as molecular contamination in a subsequent impinger sample analysis. Anion leaching resistant materials of certain embodiments are also chemically inert to the low levels of contamination present in air. By implementing impingers made from anion leaching resistant materials of certain embodiments, impinger shelf life may be extended to multiple months without affecting the background anion concentrations.

Example 3: Triggered Impinger Sampling Using Ion Mobility Spectrometry Analyzer

This example provides experimental results for a monitoring system employing triggered impinger sampling using ion mobility spectrometry (IMS) analysis. FIG. 4 provides an example of ion mobility spectrometer measurements for a mixture of reactive acids in a gas flow sampled at atmospheric pressure along with impinger sampling results for a triggered 1 hr sampling duration. As shown in the top panel, at approximately 8:20 min a rapid increase in IMS signal is observed corresponding to a real time increase in the concentration of reactive acids in the gas flow. This increase in signal is used to trigger a direction of gas flow of fluid to provide for a one-hour period of impinger sampling. During this period of trigger impinger sampling, amounts of anions including $F^-$, $Cl^-$ and $HPO_4^{-2}$ and $SO_4^{-2}$ are detected corresponding to analytes in the sampled fluid. The observed concentrations of anions are attributable to analytes in the gas flow including HF, $Cl_2$, HBr, $NO_x$, $H_3PO_4$ and $SO_x$. As shown in FIG. 4, impinger sampling based on IMS analyzer measurements provides an effective means of aligning the impinger sampling period with the onset of an event corresponding to detection of an analyte or mixture of analytes, or detection of an increase in the concentration of an analyte or mixture of analytes. As shown in FIG. 4, triggering impinger sampling via an IMS analyzer provides more useful and efficient means for monitoring analytes, such as molecular contaminants, in a gas flow.

Example 4: Impinger with Integrated Anion Leaching Resistant Reservoir

An impinger of the invention comprising an integrated anion leaching resistant reservoir was tested with respect to leaching the presence of deionized water. FIG. 5 provides a table of the concentrations of a range of different anions measured for impinger bottles corresponding to three different materials in the presence of deionized water for a stagnation time of 4 weeks or 4.7 weeks. In the table in FIG. 5, Material A corresponds to PFA, Material B corresponds to PEEK and Material C corresponds to an anion leaching resistant material. As show in FIG. 5, the impinger bottle made of an anion leaching resistant material, such as one or more of exhibited the highest resistance to leaching and thus the lowest concentrations of the measured anions. In some embodiments of this Example, for example, the impinger comprises nylon, high density polyethylene, polyetherimide, polypropylene or polyvinylchloride, or any combinations thereof. In some embodiments of this Example, the anion leaching resistant material is not a fluoropolymer. In some embodiments of this Example, the anion leaching resistant material does not comprise polytetrafluoroethylene (PTFE) or perfluoroalkoxy alkane (PFA) or PEEK.

Table 1 provide examples of target maximum leach rates for different anions, for example, so as to keep the false positive readings for impinger sampling less than 1 ppb equivalent level in an air sample.

TABLE 1

| Target Maximum Leach Rates in Deionized Water max leach rate leading to <1 ppb in 1 hr impinger draw (@1 L/min) ng/min | | | | | | |
|---|---|---|---|---|---|---|
| F— | Cl— | NO2— | Br— | NO3— | HPO4═ | SO4═ |
| 0.030 | 0.056 | 0.073 | 0.126 | 0.098 | 0.151 | 0.152 |

The target maximum allowable leach rates per minute, per acidic molecular species, shown in Table 1 correspond to a leach rate that allows a viable sample capture if deionized water is allowed to sit stagnant in the enclosed bottle for 4 weeks prior to airborne sample capture. Viability in this context is defined as the maximum concentration that could be leached which would contribute erroneous background concentrations of <lppb of airborne molecular contamination (AMC) in air after converting to airborne concentration.

FIGS. 6A-6E provides schematics of an example impinger of the present invention comprising an anion leaching resistant material including (6A) top view, (6B) vertical side view, (6C) longitudinal side view, (6D) cut away view and (6E) perspective view. Reservoir body 500 is equipped with pressurized flow inlet 510 and flow exit 520 connected by channel 515 for sampling a gas flow under analysis. This configuration of inlet and exit allows at least a portion of the gas flow to be bubbled through deionize water provided in chamber 530, which subsequently exits via exhaust 540. Components of the gas bubbled through deionized water provided in chamber 530 may be absorbed, dissolved, reacted with and/or otherwise captured in the deionized water, which can be subsequently analyzed to provide a measurement of analytes in the sampled gas flow. In an embodiment, at least a portion of the impinger in contact with deionized water, such as reservoir body 500, comprises an anion leaching resistant material such as nylon, high density polyethylene, polyetherimide, polypropylene or polyvinylchloride.

Example 5: Impactors for Characterization of Biological Particles

FIG. 7A provides a schematic diagram illustrating the general construction of a particle impactor and FIG. 7B illustrates an expanded view of a particle impactor to further illustrate the operational principal. As shown in these Figures, gas flow is directed through an intake aperture 110 in a sampling head 100 where it is accelerated towards an impact surface 130, which forces the gas to rapidly change direction, following flow paths 120. Due to their momentum, particles 140 entrained in the gas flow are unable to make the rapid change in direction and impact on the impact surface 130. In the embodiment shown in FIGS. 7A and 7B, impact surface 130 is supported by impactor base 150. In embodiments, impact surface 130 comprises the receiving surface of a growth medium, such as agar, provided in a growth medium container or petri dish. Viable biological particles collected on the impact surface, for example, can subsequently be grown and evaluated to provide an analysis of the composition of the fluid flow sampled. For collection of biological particles on the impact surface, control over the distance between the exit of the intake aperture and the impact surface is important. If the distance is too large, for example, the particles may sufficiently follow the fluid path so as to avoid impact with the impact surface. If the distance is too small, however, the particles may impact the impact surface with a force sufficient to render the particles non-viable, and therefore unable to reproduce.

The invention provides monitoring systems, combining real time analyzers and impactors, for analysis of viable biological particles in an environment undergoing monitoring, such as an aseptic manufacturing environment. An aspect of the invention is a monitoring system including impactor that integrates an agar media plate with an air sampler in an integrated single-use and/or disposable package. The present monitoring systems are well adapted for use in cleanroom environments, particularly aseptic environments, where medical products are manufactured, such as sterile medicinal products (e.g., pharmaceuticals, biologicals, diagnostics, medical devices, medical implants, etc.). In an embodiment, for example, a connector on the side of the impactor supports connection of a vacuum source (e.g., portable vacuum source (e.g., pump or fan) or house vacuum line) that draws air into slit-shaped air inlets (e.g., 20 slits, 0.1 mm nominal width) where particles are subsequently impacted onto the receiving surface of a growth medium, such as agar media. After the cleanroom air is sampled, the impactor may be transferred to a lab for incubation for multiple days to promote growth of viable microorganisms sampled. Lab technicians then count the number of CFU (colony forming units) and, if present, identify the genus or species of the microorganisms present.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements, features and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Every device, component, method, method step or combination of components or features described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when compositions of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

When a group of substituents is disclosed herein, it is understood that all individual members of that group and all subgroups. When a Markush group or other grouping is used herein, all individual members of the group and all combinations and subcombinations possible of the group are intended to be individually included in the disclosure. When a compound is described herein such that a particular isomer of the compound is not specified, for example, in a formula or in a chemical name, that description is intended to include each isomers of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

One of ordinary skill in the art will appreciate that systems, components, methods, and methods steps other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A monitoring system comprising:
   a real time analyzer for monitoring one or more analytes in a fluid;
   a sampler comprising an impinger, impactor, filter or sorbent tube; and
   a flow system operably connected to said real time analyzer and said sampler;
   wherein said flow system is configured such that upon detection of said one or more analytes in said fluid by said real time analyzer said flow system directs fluid to said sampler for sampling;
   wherein said real time analyzer comprises an optical particle counter; wherein the optical particle counter is a light scattering-based optical particle counter, extinction-based optical particle counter, fluorescence-based optical particle counter, an interferometric-based optical particle counter or any combination of these.

2. The system of claim 1, wherein said flow system is configured such that said sampler samples said fluid upon or after detection of said one or more analytes meeting one or more real time analyzer analyte detection criteria selected from the group consisting of:
   a threshold concentration of analyte;
   a threshold amount of analyte;
   a threshold frequency of detection of analyte;
   a threshold number of counts of analyte per unit time; and
   an analyte composition.

3. The system of claim 2, wherein upon detection of said one or more analytes meeting said one or more real time analyzer analyte detection criteria, a trigger signal is provided to said flow system which triggers said flow system to direct said fluid to said sampler for sampling.

4. The system of claim 1, wherein said sampler samples said fluid for at least as long as said real time analyzer detects said one or more analytes and/or wherein said sampler samples said fluid for a predetermined time upon detection of said one or more analytes.

5. The system of claim 1, wherein said sampler is isolated from said fluid except during or for a selected time period after a detection event, wherein the onset set of said detection event is triggered by the detection of said one or more analytes in said fluid by said real time analyzer.

6. A monitoring system comprising:
   a real time analyzer for monitoring one or more analytes in a fluid;
   a sampler comprising an impinger; and
   a flow system operably connected to said real time analyzer and said sampler;
   wherein said flow system is configured such that upon detection of said one or more analytes in said fluid by said real time analyzer said flow system directs fluid to said sampler for sampling;
   wherein said impinger comprises an anion leaching resistant material characterized by an anion leach rate in the presence of deionized water less than 0.5 µg $L^{-1}$ $week^{-1}$.

7. The system of claim 1, wherein said sampler is said impactor; wherein said impactor comprises:
   a sampling head comprising one or more intake apertures for sampling said fluid; and
   an impactor base operationally connected to receive at least a portion of said fluid from said sampling head; said impactor base comprising an impact surface for receiving at least a portion of analytes comprising particles in said fluid and an outlet for exhausting said fluid.

8. The system of claim 1, wherein said sampler is said sorbent tube; wherein said sorbent tube comprises a sorbent tube medium selected from the group consisting of: activated carbon, silica gel, a polymer material, Tenax, Amberlite, XAD, Polyurethane Foam and any combinations of these.

9. The system of claim 1; wherein said flow system comprises one or more valves or fluid actuators for directing fluid to said sampler for sampling.

10. The system of claim 1 further comprising a processor configured to receive a signals from said real time analyzer and configured to send a trigger signal to said flow system to initiate directing said fluid to said sampler for sampling; wherein said processor compares said signals from said real time analyzer and identifies a detection event when said signals are equal to or greater than a threshold value; wherein said processor sends said trigger signal to said flow system upon identification of a detection event.

11. The system of claim 1, wherein said fluid is a process gas or sample gas from an environment undergoing monitoring;
   wherein
   said one or more analytes are one or more acids or
   said one or more analytes are one or more bases or
   said one or more analytes are one or more volatile organic compounds or
   said one or more analytes are particles.

12. A monitoring system comprising:
   a real time analyzer for monitoring one or more analytes in a fluid; wherein said real time analyzer comprises an optical particle counter; wherein the optical particle counter is a light scattering-based optical particle counter, extinction-based optical particle counter, fluorescence-based optical particle counter, an interferometric-based optical particle counter or any combination of these;
   a sampler comprising an impinger, the impinger comprising:
      an inlet for sampling said gas; and
      a sampler reservoir containing deionized water for receiving gas from said inlet, wherein said reservoir comprises an anion leaching resistant material characterized by an anion leach rate in the presences of deionized water less than 0.5 µg $L^{-1}$ $week^{-1}$; and
   a flow system operably connected to said real time analyzer and said impinger;
   wherein said flow system is configured such that upon detection of said one or more analytes in said fluid by said real time analyzer said flow system directs fluid to said impinger for sampling.

13. A method for monitoring one or more analytes in a fluid comprising:
   providing the monitoring system of claim 1;
   monitoring said analytes in said fluid using said real time analyzer; and
   sampling the fluid using said sampler upon detection of said one or more analytes by said real time analyzer.

14. The method of claim 13, further comprising triggering said sampling step upon detection of said analyte via said real time analyzer; wherein said sampler samples said fluid upon or after detection of said one or more analytes meeting one or more real time monitoring analyte detection criteria selected from the group consisting of:
   a threshold concentration of analyte;
   a threshold amount of analyte;
   a threshold frequency of detection of analyte;
   a threshold number of counts of analyte per unit time; and
   an analyte composition.

15. The method of claim 13, further comprising providing a signal from output of said real time detector or derived from output of said real time detector to trigger said step of sampling fluid using said sampler upon detection of said one or more analytes by said real time analyzer.

16. The method of claim 13, wherein said sampler samples said fluid for at least as long as said real time analyzer detects said one or more analytes or wherein said sampler samples said fluid for a predetermined time upon detection of said one or more analytes.

17. The method claim 13, wherein said system further comprises a flow system operably connected to said real time analyzer and said sampler; wherein said flow system is configured such that upon detection of said one or more analytes in said fluid by said real time analyzer, said flow system directs fluid to said sampler for sampling.

18. The method of claim 13, wherein said system further comprises a processor configured to receive a signals from said real time analyzer and configured to send a trigger signal to said flow system to initiate directing said sampler for sampling.

19. The method of claim 13, further comprising analyzing the sampler or material collected, captured or transformed by said sampler to determine the composition or concentration of said analyte.

20. The method of claim 13, further comprising culturing particles collected or captured by the sampler to determine if said particles are biological particles.

21. The monitoring system of claim 1, wherein said sampler is said impinger and said one or more analytes are atomic analytes, molecular analytes, and/or ionic analytes.

22. The monitoring system of claim 21, wherein said one or more analytes are airborne molecular contaminants.

23. The monitoring system of claim 1, wherein said sampler is said impactor and said one or more analytes are biological particles.

24. The monitoring system of claim 1, wherein said optical particle counter monitors airborne particles having an effective diameter greater than 5 nm
   and said sampler is for airborne molecular contamination monitoring.

25. The monitoring system of claim 24, wherein said monitored airborne particles have an effective diameter between 10 nm and 0.5 µm.

* * * * *